United States Patent

Chu

[15] 3,635,695
[45] Jan. 18, 1972

[54] DESULFURIZING WITH MANGANESE OXIDE PELLETS

[72] Inventor: Vincent H. K. Chu, Bethlehem, Pa.

[73] Assignee: Bethlehem Steel Corporation

[22] Filed: Aug. 26, 1969

[21] Appl. No.: 853,196

Related U.S. Application Data

[62] Division of Ser. No. 642,182, May 24, 1967, abandoned.

[52] U.S. Cl. .................................75/6, 23/145, 252/471
[51] Int. Cl. ...................B01j 11/32, C01g 45/02, C21b 1/04
[58] Field of Search...............201/17; 75/6; 252/471; 23/145

[56] References Cited

UNITED STATES PATENTS

| | | | |
|---|---|---|---|
| 1,109,448 | 9/1914 | Messerschmitt | 23/214 |
| 2,824,047 | 2/1958 | Gorin et al. | 201/17 |
| 2,950,231 | 8/1960 | Batchelor et al. | 201/17 |
| 3,117,918 | 1/1964 | Batchelor et al. | 201/17 |
| 3,295,918 | 1/1967 | Briggs et al. | 252/471 X |
| 3,434,479 | 3/1969 | Till et al. | 252/471 X |

*Primary Examiner*—Allen B. Curtis
*Attorney*—Joseph J. O'Keefe

[57] ABSTRACT

Pellets of manganese ore and having a porosity of not less than 45 percent are disclosed. In a preferred form the major portion of the manganese content is present as manganous oxide. The balls are produced by forming a finely divided mixture of manganese ore, a carbonaceous fuel such as coke, and an addition agent which will form gaseous products on heating, and heating the balls at a temperature and for a time sufficient to partially reduce the manganese ore and obtain the required porosity. The preferred form of pellets is produced by the additional step of heating the partially reduced pellets in the presence of a reducing gas at a temperature and for a time sufficient to reduce a major portion of the manganese content to manganous oxide. The so reduced pellets are useful as sulfur acceptors for removing sulfur from solid sulfur-containing materials such as coke pellets and metallized-iron-ore pellets.

2 Claims, No Drawings

DESULFURIZING WITH MANGANESE OXIDE PELLETS

CROSS-REFERENCES TO RELATED PATENTS

This is a division of application for Letters Patent Ser. No. 642,182 filed May 24, 1967, abandoned in favor of continuation Ser. No. 871,599 filed Nov. 3, 1969, now abandoned for "High Porosity Manganese Oxide Pellets and the Method of Manufacturing Same."

BACKGROUND OF THE INVENTION

It is known in the art that manganous oxide is an excellent acceptor of sulfur and may be used to remove sulfur from solid sulfur-containing materials for example carbonaceous fuels such as coke pellets. The manganous oxide sulfur acceptor is made from high-purity manganic oxide ores such as pyrolusite, Ramsdellite and the like. Most of these ores are not readily accessible and generally must be briquetted, calcined, and crushed to a fine particle size prior to their use. Ramsdellite may, however, because of its inherent strength be calcined without briquetting after crushing the ore to a fine particle size. See U.S. Pat. No. 2,950,231. Because of their fine particle size, these ores require special techniques in material handling.

The object of this invention is to provide porous manganese-containing pellets which can be used as acceptors to remove sulfur from solid sulfur-containing materials.

SUMMARY OF THE INVENTION

The invention in its broadest aspect includes mixing a suitable amount of a carbonaceous-bearing reducing agent for example anthracite coal, bituminous coal, coke, petroleum coke, or coke breeze, a finely divided manganese ore or concentrate and a sufficient amount of a suitable addition agent for example an alkaline metal salt of carboxyl methylcellulose, balling the mixture and heating the balls at elevated temperatures to cause the carbonaceous-bearing material to partially reduce the manganese ore. During heating, gaseous products, for example carbon dioxide, are evolved. During this step, the addition agent breaks down also, forming gaseous products, for example carbon dioxide. The gaseous products escaping from the interior of the pellets form voids or pores in the pellets.

DESCRIPTION OF THE PREFERRED EMBODIMENTS

In a more detailed description of the invention, it has been found that oxidic and carbonate manganese ores may be processed into pellets which may be used as sulfur acceptors to remove a portion of the sulfur from solid, sulfur-containing materials such as coke pellets or metallized iron ore pellets. To pelletize, the raw materials described above must be crushed to a suitable size; for example, such that 65 percent of the particles will pass a 325-mesh Tyler Sieve Size. Typical ores or concentrates which may be used in the process may have the following chemical compositions:

| Mn(%) | CO₂(%) | Fe(%) | SiO₂(%) | Al₂O₃(%) | CaO(%) | MgO(%) | C(%) |
|---|---|---|---|---|---|---|---|
| 55.3 | | 1.30 | 4.45 | 2.28 | | | |
| 50.4 | | 4.20 | 4.60 | 5.30 | 0.39 | 0.33 | 0.36 |
| 31.5 | 35.7 | 5.48 | 3.90 | 1.60 | 14.8 | 2.80 | 0.45 |
| 40.0 | | 6.20 | 10.00 | 5.00 | 6.00 | 5.00 | | the remainder being incidental impurities such as $Na_2O$, $K_2O$, $P_2O_5$, $FeS_2$, Ti and As. If desired, the ores are concentrated in the conventional manner such as by fatty acid flotation, heavy media concentration, etc. The ores are mixed with at least one carbonaceous material such as anthracite coal, bituminous coal, coke, coke breeze, or petroleum coke, which has been ground to a suitable size for pelletizing, for example −200-mesh Tyler Sieve Size, and an addition agent which will decompose during subsequent heating to form gaseous products such as CO or $CO_2$, for example an alkaline metal salt of carboxyl methylcellulose. The mixture is formed into balls. It may be desirable to add a small amount of a binder such as bentonite to the mixture, for example between about 5 pounds and about 20 pounds per ton of ore to give the balls green strength. The green balls are heated at a temperature and for a time sufficient to produce relatively hard pellets. During the heating step, the carbonaceous material reacts with the manganese ore to partially reduce the ore to manganous manganite ($MnO \cdot Mn_2O_3$). Some manganous ferrite ($MnO \cdot Fe_2O_3$) may be formed if the ore contains sufficient iron. Gaseous products, primarily carbon dioxide, are formed in the reaction. The carboxyl methylcellulose salt also breaks down to form gaseous products such as carbon dioxide. The gaseous products, in escaping from interior of the pellets outwardly to the surface of the pellets, form minute passages or pores. Pellets produced according to the process of the invention develop a porosity of not less than about 45 percent during the heating step.

It has also been found that by subjecting the pellets to a second heating step, in the presence of a reducing gas, the manganese oxide can be further reduced to obtain pellets which are substantially all manganous oxide (MnO), and have a porosity of not less than about 60 percent. These pellets can then be used as sulfur acceptors to remove a portion of the sulfur in solid, sulfur-containing materials such as coke pellets, or metallized iron-ore pellets. The solid, sulfur-containing materials are mixed with the manganous oxide pellets. The mixture is heated at a suitable temperature, for example, between about 1,100° to about 1,650° F. and a gas containing hydrogen is passed through the mixture. The sulfur passes from the solid, sulfur-containing material to the manganous oxide pellets.

The amount of carbonaceous material required to partially reduce, and to assist in forming pores in the manganese ore pellets in the initial heating step may vary over a wide range, for example from about 600 pounds to about 1,000 pounds per ton of manganese ore with 800 pounds a preferred amount. Too large an amount of carbonaceous material added to the ore will result in the pellets becoming too hot and fusing together to form clinkers. Too little carbonaceous material added to the manganese ore will result in insufficient reduction of the ore and insufficient porosity.

The amount of decomposable addition agent which should be added may be between about 9 pounds and about 13.5 pounds per ton of manganese ore.

The porosity of the pellets is determined by the following formula:

$$\text{Porosity} = \frac{\text{true density} - \text{apparent density}}{\text{true density}} \times 100$$

where the apparent density is obtained by the well-known mercury method and the true density is determined by the standard air pycnometer method.

In an example of the invention a synthetic ore mixture of the following analysis was used:

| Mn(%) | Fe(%) | SiO₂(%) | Al₂O₃(%) | CaO(%) | MgO(%) |
|---|---|---|---|---|---|
| 33.56 | 7.37 | 13.58 | 6.62 | 6.10 | 5.18 |

A balling mix was then made having the following composition:

| | |
|---|---|
| Synthetic ore mix (65% −325-mesh Tyler Sieve Size) | 2,000 parts |
| Anthracite coal (−200-mesh Tyler Sieve Size) | 800 parts |
| Sodium Salt of Carboxyl Methylcellulose | 12 parts |
| Bentonite | 10 parts |

The mix was balled in the conventional manner to form balls between one-fourth inch in diameter and one-half inch in diameter.

Separate portions of the balls were fired in a muffle furnace in the presence of air under varying conditions as follows:

| test no. | bed depth (inches) | heating temperature (°F.) | heating time |
|---|---|---|---|
| 1 | 1 | 2300 | 15-20 min. |
| 2 | 1 | 2200 | 40 min. |
| 3 | 1 | 2000 | 60 min. |
| 4 | 4 | 2100 | 5 hr. |

All the fired pellets developed a porosity of 52.4 percent or more. The major mineralogical constituent of the pellets was manganous ferrite ($MnO \cdot Fe_2O_3$) with the minor constituent being ($MnO \cdot SiO_2$).

A portion of the fired pellets was then activated by heating the pellets to within the temperature range of 1,600°–1,650° F. for from 20 to 30 minutes while carbon monoxide was passed through the bed. All of the pellets were found to have a porosity of 63.1 percent or more with the major mineralogical constituent now being manganous oxide (MnO).

A mixture of metallized iron ore pellets and the activated manganous oxide pellets was heated at 1,650° F. for 1 hour in the presence of hydrogen gas. The sulfur content of the metallized iron ore pellets was reduced from 0.65 to 0.28 percent and the sulfur content of the manganous oxide pellets was increased from 0.004 to 0.305 percent.

In another specific example of the invention a mix of the following composition was made:

| | |
|---|---|
| Amapa ore (65% −325-mesh) (Mn content 31.5%) | 2,000 parts |
| Anthracite (−200-mesh) | 800 parts |
| Sodium Salt of Carboxyl Methylcellulose | 12 parts |
| Bentonite | 10 parts |

The mix was formed into balls one-fourth inch in diameter in the conventional manner. Separate portions of the balls were heated in the presence of air under the following conditions:

| test no. | bed depth (inches) | heating temperature (°F.) | heating time (hrs.) |
|---|---|---|---|
| 1 | 1/2 | 1960 | 3½ |
| 2 | 1/2 | 2160 | 2 |
| 3 | 1½ | 2050 | 7 |
| 4 (heated twice) | 4 | 1960 | 20 (1st cycle) |
| | | 2100 | 8 (2nd cycle) |

The pellets had a porosity of not less than 51.4 percent and the major constituent as determined by X-ray identification was manganous manganite ($MnO \cdot Mn_2O_3$).

The pellets were then activated by heating at 1,600° F. for 30 minutes in the presence of CO gas. The porosity of the pellets was found to be not less than 66.5 percent and the major constituent as determined by X-ray identification was found to be manganous oxide (MnO).

A mixture of metallized iron ore pellets and the activated manganous oxide pellets was made. The bed of the mixed pellets was heated on 1,650° F. for 1 hour in the presence of hydrogen gas passed therethrough. The sulfur content of the metallized iron ore pellets was reduced from 0.13 to 0.035 percent while the sulfur content of the manganous oxide pellets was increased from 0.005 to 0.13 percent.

In this specification, wherever percentages are referred to, such percentages are by weight except as otherwise indicated.

I claim:

1. In a method for removing sulfur from solid sulfur-containing materials in which said solid sulfur-containing materials are mixed with a porous sulfur acceptor and the mixture is heated to a temperature of about 1,650° F. for a time in the presence of hydrogen gas wherein said sulfur acceptor comprises pellets consisting essentially of porous manganese oxides, and having a diameter of about one-fourth inch to about one-half inch, the major portion of the manganese oxides is manganous oxide and the porosity of the pellets is not less than about 45 percent.

2. Method according to claim 1 in which the solid sulfur-containing materials are metallized iron ore pellets.

* * * * *